United States Patent Office 2,783,133
Patented Feb. 26, 1957

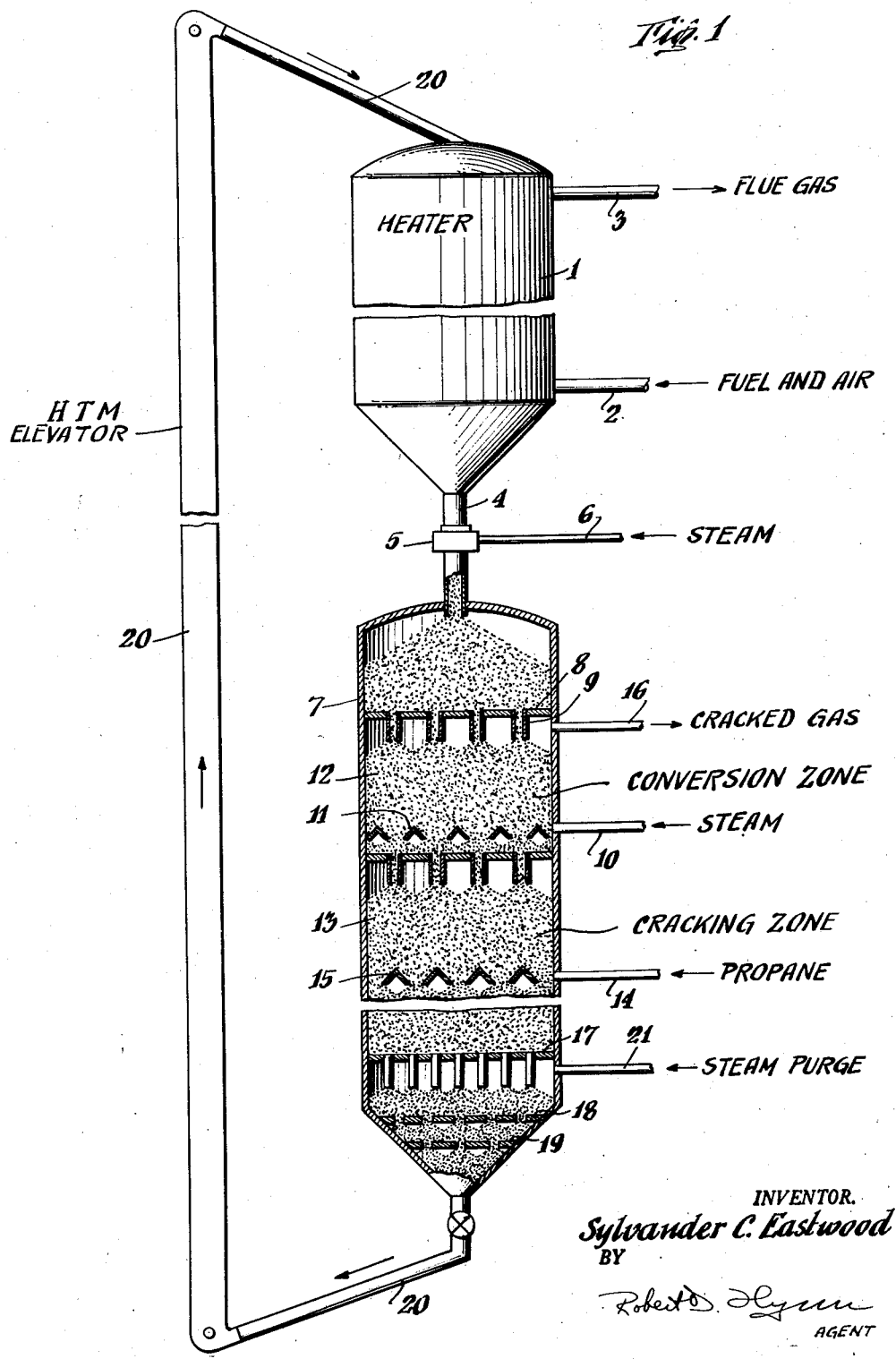

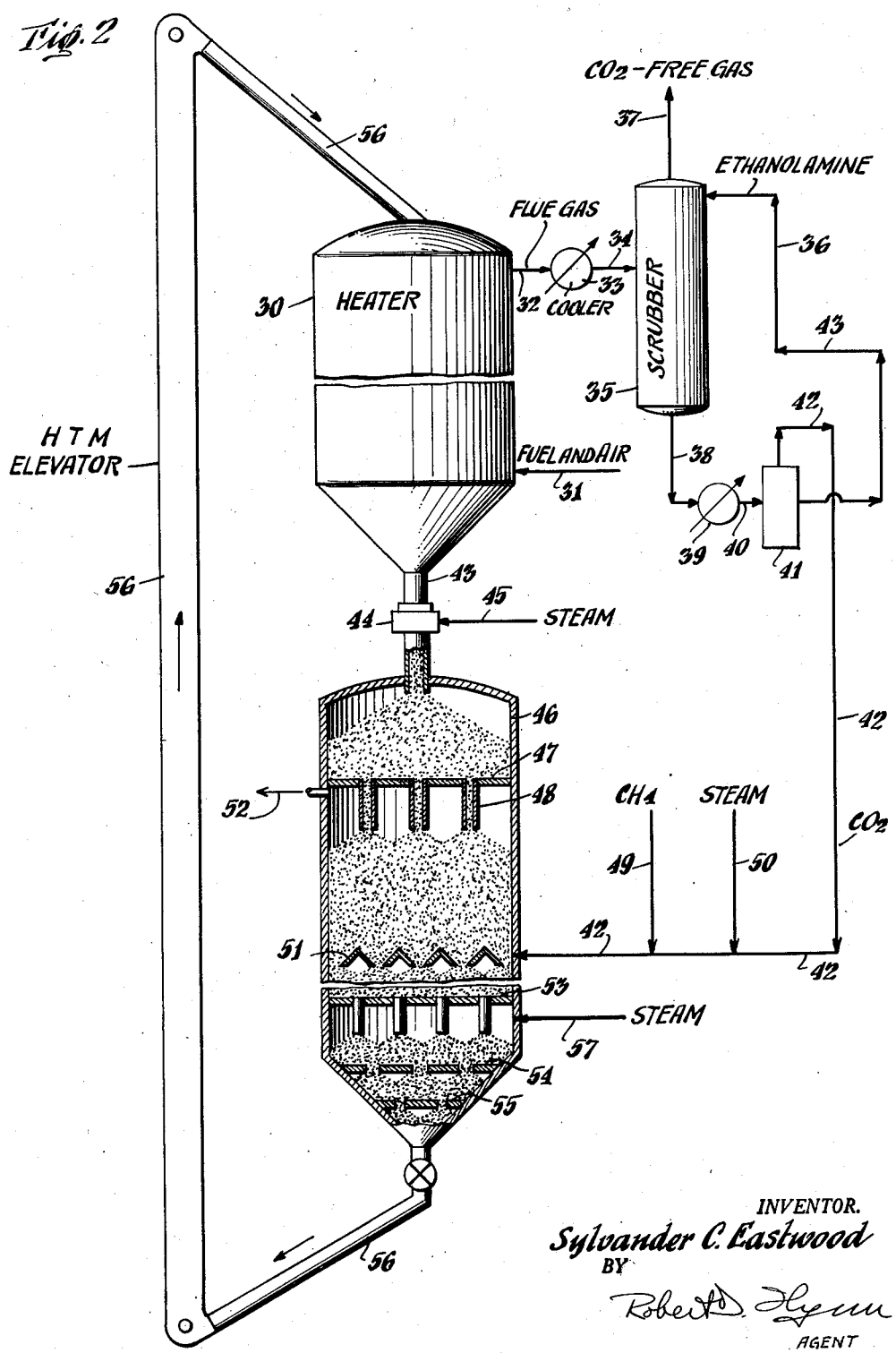

2,783,133

HYDROGEN PRODUCTION

Sylvander C. Eastwood, Woodbury, N. J., assignor to Socony Mobil Oil Company, Inc., a corporation of New York Application December 5, 1952, Serial No. 324,213

2 Claims. (Cl. 23—212)

This invention has to do with the production of hydrogen. More particularly, the invention is concerned with the conversion of light hydrocarbons, in the presence of hot, solid, contact mass materials, to hydrogen.

The production of hydrogen from light hydrocarbons, such as methane, has long been known in the art. Generally, a mixture of a hydrocarbon gas and an oxidizing agent, such as a mixture of methane and steam, has been contacted with an inert solid material or with a catalytic solid material, under suitable conditions of temperature, time and presence. However, all of such processes have been attended by a serious shortcoming, namely, the difficulty of providing a large quantity of heat of reaction at a high temperature level of the order of 1500–2000° F. It has now been found that this difficulty can be overcome by cracking light hydrocarbons in a thermofor pyrolytic cracking operation under interrelated reaction conditions such that efficient conversion of hydrocarbons to hydrogen is realized. Thermofor pyrolytic cracking operations have been described in the literature, for example in Oil and Gas Journal, August 26, 1948, and in numerous domestic patents representative of which are: 2,432,503; 2,432,962; 2,436,254; 2,437,383; 2,439,730; 2,444,274; 2,445,554; 2,448,257; 2,448,922; 2,531,294; 2,513,995 and 2,519,315.

It is an object of this invention to provide an improved process whereby light hydrocarbons are converted efficiently to hydrogen. It is another object of this invention to so convert light hydrocarbons to hydrogen by providing a large and satisfactory quantity of heat of reaction at high temperature levels. Other objects will become apparent from the following description.

According to the present invention, a light hydrocarbon is contacted with a hot, solid heat transfer medium in a lower section of a reactor, whereupon the light hydrocarbon is cracked to methane, hydrogen and coke, and the cracked products are then contacted with steam at a higher temperature in an upper section of the reactor, whereupon all or substantially all of the methane and a portion of the coke is converted to additional hydrogen and carbon monoxide gases.

The present invention also includes a modification of the procedure described immediately above, that is, contacting a light hydrocarbon with a hot, solid heat transfer medium of catalytic nature in a lower section of a reactor with steam and carbon dioxide, whereupon the light hydrocarbon is cracked and converted to hydrogen and carbon monoxide.

The invention may be more readily understood by reference to the attached drawings which are elevational views in section of preferred embodiments. It will be recognized that these drawings are highly diagrammatic in form.

A granular solid heat transfer material (HTM), such as fused alumina pellets of about 0.3 inch in diameter, is heated in heater 1 by combustion of fuel and air supplied through line 2, the flue gases being withdrawn through line 3 and being conveyed to a suitable stack or economizer. The granular solid at a temperature of about 1600–2000° F., is transferred downwardly through a feed leg 4 having a steam sealing chamber 5, to which steam is introduced via line 6, to reactor 7.

A plate 8 in the top of reactor 7 provides a bulk supply hopper in the top of the reactor from which the hot solid passes downwardly by feed pipes 9 to provide a compact moving bed in a reaction zone. Steam is introduced through line 10, to be distributed across the bed by inverted angles 11, from which it passes upwardly through the hot solid countercurrent to movement of the bed to be rapidly heated to the temperature of the granular solid and to be reacted with gases rising upwardly through this zone (12) of the reactor. The temperature of the hot solid is about 1700° F., or broadly from about 1500° F. to about 2000° F., in the area in which the steam and hot gases react.

Below the conversion zone 12 is a cracking zone 13. The solid is transferred downwardly between the zones at a temperature of about 1600 to 1800° F., and propane is introduced into the propane-cracking zone (13) by line 14 and is distributed across the bed by inverted angles 15. Propane is introduced as a cold feed through line 14, and is in contact with hot solid at a temperature in the range of 1400 to 1700° F. for a period of 5 to 10 seconds. Under such conditions essentially all of the propane is converted to methane, hydrogen and coke. It will be recognized that substantially all of the coke will adhere to or be deposited upon the hot solid, and that methane, hydrogen and any other gases will flow upwardly from cracking zone 13 to conversion zone 12. In the conversion zone 12, sufficient steam is brought in via line 10, that substantially all of the methane is converted to hydrogen and carbon monoxide. The resulting gases, mainly hydrogen and carbon monoxide, are removed from the top of the reactor through line 16.

Carbon monoxide, the main impurity of the hydrogen in line 16 is removed by conversion thereof (not shown) to carbon dioxide and by absorption (not shown) of the carbon dioxide in a conventional manner. For example, carbon monoxide can be passed over cupric oxide at elevated temperature, whereby it is converted to carbon dioxide; under such conditions hydrogen is not affected. The resulting gas can then be scrubbed with caustic or ethanolamine to remove carbon dioxide. The final product is relatively pure hydrogen.

Referring now to the bottom of reactor 7, granular solid is withdrawn uniformly therefrom by means of flow control plates 17, 18, and 19 and is returned via elevator 20 to the top of heater 1 for recycling in the system. Preferably, the solid is purged with steam before discharge as by admitting steam at port 21 between the control plates 17 and 18. If additional cooling is found desirable, water can be introduced through port 21. Coke deposited on the solid in cracking zone 13 is removed during combustion in heater 1.

Reference is now made to Figure 2, which portrays another embodiment of this invention. This procedure is one means by which the conversion of light hydrocarbons to hydrogen is effected in the presence of a suitable catalyst. For example, nickel nitrate or nickel acetate can be impregnated upon a granular solid heat transfer material, such as mullite, and can be converted to nickel oxide at 1500° F. Use of a catalyst such as nickel oxide makes possible the production of synthesis gas with the addition of steam and carbon dioxide, according to the following relationships:

(1)  $CH_4 + H_2O \rightarrow CO + 3H_2$ (2) 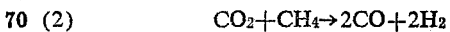 $CO_2 + CH_4 \rightarrow 2CO + 2H_2$ By using two molar proportions of steam for one molar proportion of carbon dioxide, a gaseous product is obtained with a H₂:CO ratio of 2:1, which is the correct ratio for synthesis gas generation. By varying the ratio of carbon dioxide to steam, the composition of the synthesis gas can be varied from a H₂:CO ratio of 3:1 to 1:1.

Referring now in detail to Figure 2, showing a means for recovering carbon dioxide for reaction with methane, a granular solid HTM having deposited thereon about five percent by weight of nickel oxide, is heated in heater 30 by combustion with fuel and air introduced via line 31. Flue gas containing carbon dioxide is withdrawn from the heater (30) through line 32, cooler 33, line 34 and is introduced into a central section of scrubber 35. The flue gases flow countercurrent to ethanolamine, which is added to 35 through line 36. Ethanolamine removes carbon dioxide from the flue gases, and a CO₂-free gas is removed from the top of 35 through line 37. Ethanolamine and carbon dioxide are removed from the bottom of 35 through line 38, are cooled in cooler 39 and are carried via line 40 to separator 41. Carbon dioxide is taken overhead from 41 via line 42; and ethanolamine is removed from 41 through line 43 and is so recycled to scrubber 35.

Combustion of the fuel and gas in heater 30 provides the HTM containing nickel oxide with a temperature of about 1600–2000° F. as it passes downwardly therethrough. The hot HTM passes downwardly through feed leg 43 having steam sealing chamber 44 to which steam is added via line 45. From feed leg 43, the hot HTM passes to reactor 46. The reactor (46) is provided with plate 47 which makes possible a bulk supply hopper in the top of the reactor. The hot HTM continues downwardly through the reactor (46) via feed pipes 48 to provide a compact moving bed in a reaction zone.

A cold feed mixture of methane, steam and carbon dioxide, is introduced to reactor 46 through line 42; methane in line 49 and steam in line 50 are added to CO₂ in line 42. The feed mixture is distributed across the bed by inverted angles 51, from which it passes upwardly through the hot HTM countercurrently to movement of the bed such that it is rapidly heated to the temperature of the HTM and such that the individual components thereof—methane, steam and CO₂—enter into reaction in the presence of the catalyst nickel oxide. Temperatures suitable for catalytic reaction are about 1500 to 2000° F. with a residence time of 1 to 5 seconds. Synthesis gas comprising hydrogen and carbon monoxide, is produced according to the equations recited above. The synthesis gas flows up through the reactor (46) and is removed through line 52.

Granular HTM is withdrawn uniformly from reactor 46 by means of flow control plates 53, 54 and 55 and is returned, via elevator 56, to the top of heater 30 for recycling. As before, steam can be used as a purge at port 57, and coke is removed from the HTM in heater 30 during combustion of the fuel and air therein.

The granular heat transfer material employed in the process of this invention should be a solid material having a relatively low or substantially no catalytic cracking activity, a high heat absorption capacity and it should be capable of withstanding high temperatures of the order of 2000° F. without severe breakage, cracking or attrition. The material can be nonporous, for example, metallic pieces or balls. Preferably, however, the solid material should be porous, for example, natural clays which have become deactivated so as to have a very low activity as cracking catalyst. Other materials which can be employed are pumice, mullite, fused alumina, silica, etc. A preferred heat carrying material is granular petroleum coke. The granular material can range in size from about 100 mesh Tyler up to about one inch in diameter, preferably of the order of one-eighth to one-quarter inch diameter. The term "granular" is employed herein a broad sense as including solids in various shapes, and forms such as pellets, tablets, spheres and irregular shaped particles.

The catalyst employed for the catalytic conversion of light hydrocarbon to hydrogen and carbon dioxide, as illustrated above by reference to Figure 2, is impregnated upon any of the aforementioned heat transfer materials. The catalyst is preferably nickel but any other of the well known dehydrogenation catalysts such as chromium, molybdenum, cobalt, iron, palladium or platinum can be used.

Although the invention is illustrated above by the conversion of methane and propane to hydrogen, it is to be understood that any of the light hydrocarbons up to and including butanes can be so converted. It is also to be understood that unsaturated, as well as saturated hydrocarbons can be used. And it is further understood that mixtures of such light hydrocarbons—such as mixed feed of C₂ and C₃ hydrocarbons—can be utilized. As a note of caution, it will be recognized by those skilled in the art that higher temperatures and longer contact times are to be used in converting methane to hydrogen than in similarly converting ethane, and that progressively lower temperatures are to be used in converting propane and butanes.

I claim:

1. The process which comprises: passing a hot granular solid downwardly in series through an upper reaction zone and a lower reaction zone; transferring said solid downwardly from said upper zone to said lower zone through at least one transfer zone of restricted cross-section; passing a normally gaseous hydrocarbon heavier than methane in direct contact with said solid in said lower zone at a temperature between about 1400° F. and about 1700° F. and for a contact time between about ten seconds and about five seconds, whereupon said hydrocarbon is cracked to methane, hydrogen and coke; passing steam and said cracked products in direct contact with said solid in said upper zone at a higher temperature between about 1700° F. and about 2000° F. and for a contact time between about one second to about five seconds, whereupon said methane is converted to additional hydrogen.

2. The process defined by claim 1 whereupon the gaseous hydrocarbon is propane.

References Cited in the file of this patent
UNITED STATES PATENTS

| | | |
|---|---|---|
| 2,523,284 | Eastman | Sept. 26, 1950 |
| 2,607,670 | Lewis | Aug. 19, 1952 |
| 2,608,478 | Pollock | Aug. 26, 1952 |
| 2,632,690 | Atwell | Mar. 24, 1953 |
| 2,647,041 | Robinson | July 28, 1953 |

FOREIGN PATENTS

| | | |
|---|---|---|
| 390,849 | Great Britain | Apr. 5, 1933 |